United States Patent [19]

Gerlach

[11] Patent Number: 4,698,647

[45] Date of Patent: Oct. 6, 1987

[54] HIGH RESOLUTION PHOTOGRAPHIC FILM PRINTER

[75] Inventor: Richard K. Gerlach, Rolling Hills Estates, Calif.

[73] Assignee: Truvel Corporation, Torrance, Calif.

[21] Appl. No.: 862,674

[22] Filed: May 13, 1986

[51] Int. Cl.[4] .......................... G01D 9/42; H04N 1/23
[52] U.S. Cl. .................................. 346/108; 358/296; 358/302
[58] Field of Search ................ 346/108, 107 R, 76 L, 346/160; 358/296, 302

[56] References Cited

U.S. PATENT DOCUMENTS

| | | | |
|---|---|---|---|
| 3,958,250 | 5/1976 | Rolon | 346/108 |
| 4,479,133 | 10/1984 | Shiozawa | 346/108 |
| 4,528,573 | 7/1985 | Behrens | 346/108 |

Primary Examiner—E. A. Goldberg
Assistant Examiner—Mark Reinhart
Attorney, Agent, or Firm—Knobbe, Martens, Olson & Bear

[57] ABSTRACT

A photographic film printer that forms an image on film based upon received or stored digital information is provided. While maintained in a stationary position, the film is exposed in a sequence of raster scans by a rotating disk traversing the photographic film surface. At least one optical film is attached to the rotating disk in a manner that transmits optical energy directed towards the center of the disk to a peripheral location on the disk. Exposure of the film occurs by controlling the emission of optical energy by the fiber in accordance with the received or stored digital information as the peripheral edge of the disk rotates past the film surface.

9 Claims, 12 Drawing Figures

HIGH RESOLUTION PHOTOGRAPHIC FILM PRINTER

BACKGROUND OF THE INVENTION

1. Field of the Invention

The present invention relates to film printers, and more particularly, to such printers as are used to expose light-sensitive film in accordance with digitized signals generated and/or stored in a data processing system.

2. Description of the Prior Art

The co-extensive requirements of telecommunications and graphic display peripherals have generated a need for improved digitized printers and plotters. Beginning with the very early facsimile machines having synchronized revolving drums, printing technology has progressed to the more recent facsimile machines that linearly form an image on advancing paper. Throughout this technological progression, there has existed competition between designs providing high resolution images and designs enhancing the speed of transmission. The original reproduction process was sufficiently slow and cumbersome that resolution was consistently sacrificed lest the entire transmission process become entirely unworkable. Such resolution characteristics essentially limited the transmitted data to words and very general geometric shapes, with the high resolution (600 lines/inch and even greater values) applications primarily limited to the transmission of photographs for use by newspapers and magazines.

The rapid advances in data processing have likewise caused improvements in the manner by which data is transmitted. Initially, the prime mechanism for converting computer images into a fixed copy was the graphic plotter. Utilizing a fixed coordinate system and locating the data points at specific X-Y values, the graphic plotter can obtain a degree of resolution limited only by the mechanical mechanisms used to located the plotter on the coordinate system. Unfortunately, this data is "plotted" one point at a time, and the speed of transmission is limited by the amount of time it takes the plotter to physically move between data points.

With respect to the more general facsimile machines, the previous use of treated paper and electrolytic process has now been supplanted in the more sophisticated units with laser and electrostatic technology. In one commercially available product, the Allied Laser Linotype, photographic film is incremented past a linear scanning zone wherein a laser exposes the film in conformance with stored digital information to obtain the graphic representation.

In a more recent development, Computer Circuit, Inc., of Gardena, Calif., offers a laser photoplotting system produced by MacDonald Dettwiler that utilizes an internal spinning mirror that deflects the laser beam and directs it towards a stationary outer circumferential layer of film supported by a curved glass plate. As presently understood, this product, (model "Fire 9000"), provides high resolution images by gradually incrementing the spinning mirror in a linear manner along its axis of rotation. Each linear increment of the mirror exposes an additional section of film. The film is placed in a cylindrically curved planar configuration with respect to the mirror, thereby maintaining the film surface equidistant from the rotating mirror system along its entire linear path.

The most important operating characteristic for high resolution printers is reproducibility of results. With the exception of the MacDonald Dettwiler laser photoplotting system, all of the prior printers have inherent limitations in this regard due to inevitable problems in paper or film transport, primarily film slippage. In addition, the mechanics of getting the exposing energy to the film must be highly reliable to ensure that exposure ensues in an exceedingly systematic way across the entire film surface.

SUMMARY OF THE INVENTION

The present invention has as an underlying objective the improvement in the presently known film printers by the provision of a single, small diameter optical fiber pointed at and located immediately adjacent to the surface of the light-sensitive film as the mechanism for mechanically obtaining an image of exceedingly high resolution on the film. This goal is inventively achieved by providing a rotatable disk with one end of a very fine optical fiber attached to and transmitting data to the film from the peripheral surface of the disk, with the other fiber end located at or near the axial center of the disk. A light-emitting diode (LED) driven by an electrical signal from an outside source is located immediately adjacent the axial end of the fiber. The fiber thereby transmits the coded light signals generated by the LED to the film for the exposure thereof. These original signals may be directly generated from an optical reader in the case of a direct image transmission or they may be the output of an interactive computer system, such as a digital image processor - either directly or from a buffer.

The rotatable disk traces the LED-excited fiber across a semicircularly-arranged expanse of film. Exposure thereafter proceeds in a segmental manner, with the disk being laterally moved, line-by-line, across the film surface. Each passage of the LED-excited fiber is considered to be an exposure track, and discrete rotations of a lead screw cause lateral movement of the rotating optical fiber disk, creating a raster scan of exposure lines on the film. Since 180° is essentially the greatest practical tracing arc obtainable, it is possible to provide two LED-excited fibers located 180° apart. On such occasion, the rotating disk will be laterally advanced after each half-rotation. Thus, as one LED-driven fiber starts an exposure "track", the other fiber is leaving the area of exposure. Plotting of the image thereafter proceeds at a doubled rate over that obtained with only one fiber.

Obtaining high resolution requires the maintenance of absolute control between the relative position of the film and the position of the optical fiber disk. This control is first inventively achieved in the present instance by retaining the film in a fixed location. Support for the film is provided at its outer edges by stationary rings, with the rings laterally adjustable to accommodate differences in film width. The second level of control over the film positioning is achieved by providing a pair of stationary film support shoes immediately adjacent the rotating optical fiber disk, with one shoe located on either side thereof. The stationary shoes form a support for the film and accurately reference its emulsion surface with respect to the spinning fiber. As mounted on the stationary rings and film support shoes, the film assumes a semicircular, cylindrical shape, preferably extending over more than an 180° arc to ensure accurate exposure over a full 180° surface.

Additional control is obtained over the film/optical disk positioning by providing a mechanically reliable and positive method of controlling the lateral position of the disk with respect to the film. The LED disk, the support shoes, and the motor drive for the disk all move as one unit in a lateral direction along the axis of rotation. Accurate lateral motion is provided by a stepping motor. At the 1,000 pixel/inch-exposure resolution, the controlled rotation of a lead screw advances the optical fiber disk across the film in 0.001 inch (0.025 mm) increments for each new exposure path.

With the photographic film substantially fixed in location by the stationary rings and the support shoes, the high resolution requirement likewise demands that the precise location of the emitting optical fibers be readily determinable at all times. Not only is it necessary to ensure that the flow of information bits coincides with the expanse of film, but precise spatial location is important to ensure consistency in exposure, accurately reproducing the image free of linear distortion.

Under the present invention, the spatial orientation of the optical fiber is provided by utilizing a magnetic track that rotates in synchronism with the rotatable optical disk and is read by a stationary magnetic pickup. The magnetic track may conveniently be provided as a surface on the optical fiber disk or as a surface formed on a second disk, one that can be smaller in diameter and placed inside one of the stationary shoes. The magnetic head reads a pre-recorded clock track, and a code buried in the clock track at two locations effectively 180 degrees apart. When either of these codes pass under the magnetic head, the optical fiber(s) are positioned at one or both exposure edges of the film. For example, where two fibers are used, the 180° markers are placed to coincide with the entry of one fiber into the area of film to be exposed and the exit of the other fiber from the film after its exposure track has been completed.

Each segment of information for each clock on the track represents an exact pixel location. The earlier value of 1,000 pixels/inch was based upon the selection of an optical fiber having a diameter of approximately 1 mil (0.025 mm), i.e., the diameter of pixel exposure. There are thus 1,000 clocks for each inch the fiber travels along the film's surface. In addition, each time the magnetic head reads one of the 180° codes, the fiber position must be moved one step laterally with respect to the film to bring a new, unexposed track of film in position for the succeeding scan. Upon each pass of the magnetic head by a 180° code, the stepper motor causes the optical fiber assembly to laterally travel one incremental step, a value of 0.001 inch (0.025 mm), the approximate diameter of the fiber. This 0.001 inch incremental movement during the exposure creates no adverse consequences with respect to the image quality, both because of its consistency throughout the lateral travel of the optical fiber disk, and because the translation of the stepper motor movement through the lead screw can provide for a smooth transition between scan tracks.

If two magnetic heads are provided, the magnetic track can also conveniently function as an inexpensive buffer for storing the pixel exposure information for each exposure scan. Upon obtaining the start-up 180° signal, and after providing information required for the first exposure scan, the next-following scan can be placed in this temporary magnetic buffer for reading by the subsequent scan.

As set forth in the foregoing, the present invention provides an axially driven set of signals that are transmitted to the periphery through the mechanical apparatus in a manner that guarantees stability and reproducibility of film exposure, permitting dependable reproduction at high resolution values. Moreover, the mechanical apparatus of the present invention is of the greatest simplicity and is straightforward and easy to manufacture. Neither the rotational mechanics nor the informational electronics and control functions are of a complex nature. For high contrast, i.e., on/off (bilevel) film exposure, a single LED is used. With no change to any of the mechanics, a continuous-tone film exposure can be obtained utilizing 256 digital, gray scale current levels. A color film printer only requires, as far as the mechanics are concerned, a three-chip (LED) replacement for the present single chip. The red, green, and blue LED emissions would, through the same single fiber(s), combine to produce a complete color spectrum at the disk periphery.

The mechanical retention of the film, and the method of supporting the film at the time of exposure using the lateral stationary rings and the adjacent support shoes, enables the high resolution exposure of the film to be readily reproduced with subsequent film exposures. The geometry of the exposure in such as to ensure exact duplication except for variations caused by temperature differentials. This otherwise perfect matching will occur throughout the full extent of exposure, even over a full 12 inch by 18 inch (30 cm by 46 cm) area.

Additional flexibility with respect to film exposure is possible through the utilization of laser diodes located at the disk periphery. Laser diodes will not only permit multiple, parallel outputs (exposures), they also have the added advantage of permitting a greater spacing tolerance between disk and film. Coupling of the laser signal can be accomplished by any of several means, including slip rings, optical, rotating secondary coil magnetically coupled to a stationary primary of a transformer, etc. By providing the opportunity to place more exposure power at the periphery, while exercising a greater degree of control, the use of laser diodes is made particularly advantageous.

A greater separation of the optical fiber from the film exposure surface, and therefore a greater degree of tolerance of this critical dimension, can be achieved by adding a lens near the end of each fiber. The lens is so selected such that the "image" of the fiber is projected onto the surface of the film. The increased control obtained over the light signal permits greater variation in the distance between the output fiber and the photographic film, thereby improving the quality of the image produced.

Various other objects, advantages, and features of the present invention will become readily apparent from the ensuing detailed description, and the novel features will be particularly pointed out in the appended claims.

DESCRIPTION OF THE PREFERRED EMBODIMENT

Figure 1:
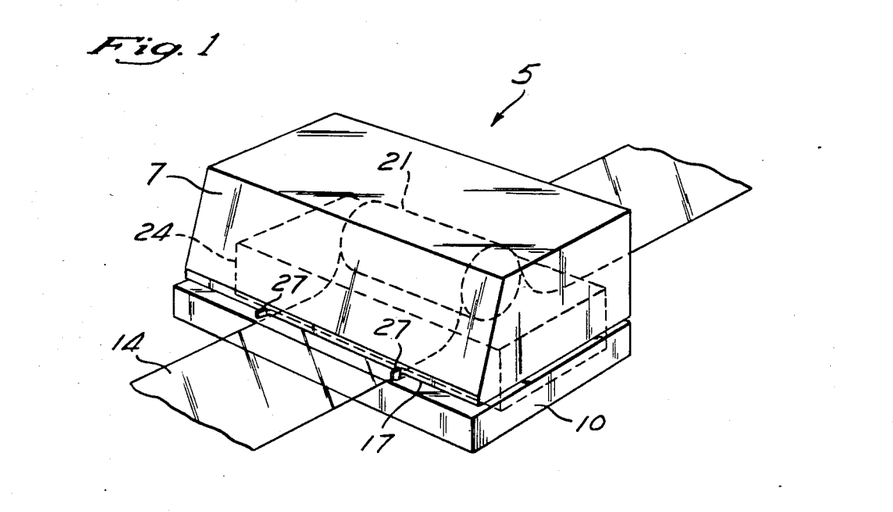
FIG. 1 is a perspective view, with portions in phantom, showing a housed photographic film printer according to the present invention.

A photographic film printer 5 is shown in FIG. 1, the mechanical apparatus of the film printer 5 being contained within an outer housing consisting of an upper housing or cover 7 received by and mounted upon a housing base 10. A sheet of photographic film 14 is received within an outer housing film slot 17 and passes through the film printer 5 forming an exposure shell 21 (shown in phantom) within the film printer 5 at the location where the photographic film 14 is exposed. The photographic film 14 is thereafter removed from the exposure shell 21, passing from the film printer 5 through a second film slot (not shown in FIG. 1).

Figure 2:
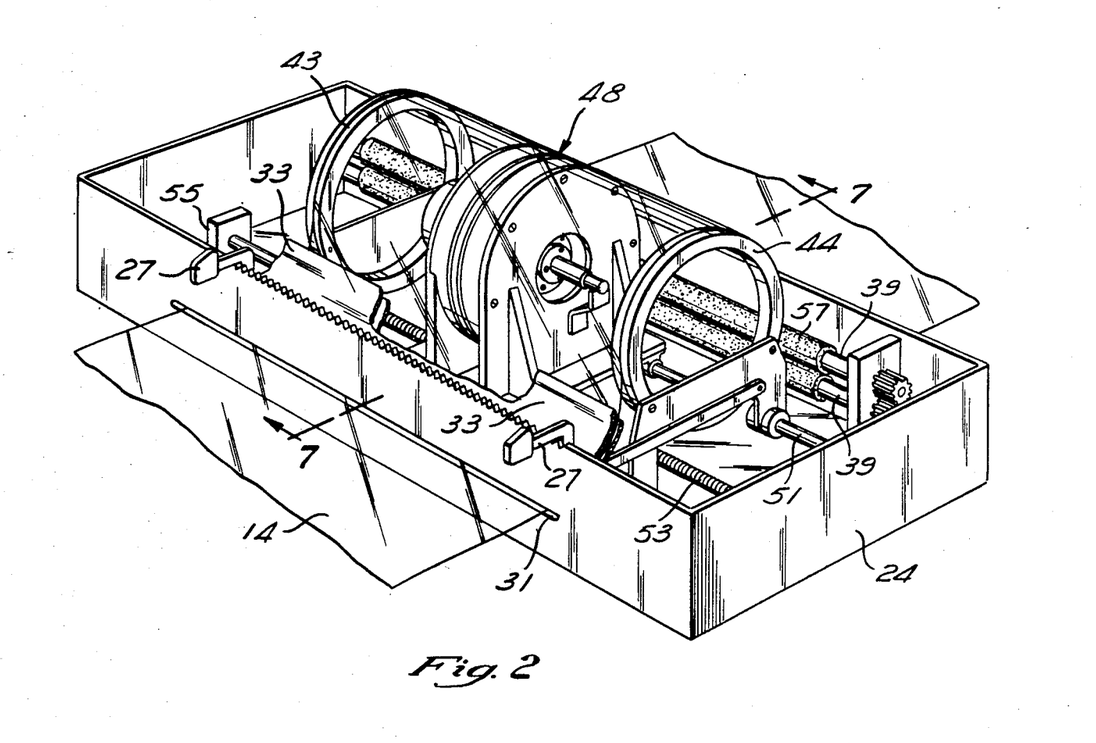
FIG. 2 is a perspective view with portions broken away showing the photographic film printer according to the present invention having the outer, protective housing removed.

As shown in phantom in FIG. 1, the exposure shell 21 is located within a printer support base 24, and consists of a number of separate film supporting structures located within the printer support base 24, (see FIG. 2). A pair of film guides 27 located within the housing film slot 17 are provided for lateral adjustment of the interior film supporting structures depending upon the width of the film 14, as will be described in greater detail hereinafter. As shown in FIG. 1, the overall printing process of the present invention has the photographic film 14 entering into the photographic film printer 5, being exposed while in the semicircular configuration of the exposure shell 21, and thereafter passing from the film printer 5 to a take-up assembly (not shown).

The general structures used to provide the support and exposure of the photographic film 14 are best shown with reference to FIG. 2. Upon entering the outer housing, the film 14 (depicted as transparent in the figures for illustrative purposes) enters the printer support base 24 through a support base film slot 31 formed in a lateral wall thereof. The film 14 next passes through a pair of film take-up pinch rollers (not shown in FIG. 2) that grip the film and propel it through a pair of film loading guides 33 that direct the film 14 towards the various elements referred to in FIG. 1 as the film exposure assembly 21. The film is directed by the film loading guides 33 in a manner that will place the film 14 in the proper position for achieving consistent uniform exposure. After passing over the film exposure assembly 21, remaining long enough for the exposure thereof, the film exits the printer support base 24 through a pair of film discharge pinch rollers 39 and then through a slot (not shown) similar in structure to the support base film slot 31, formed in the printer support base 24. The exit pinch rollers 39, along with the pair of take-up pinch rollers (not shown in FIG. 2) adjacent to the support base film entry slot 31, provide the means by which the photographic film 14 is transported through the photographic film printer 5.

Figures 3, 4:
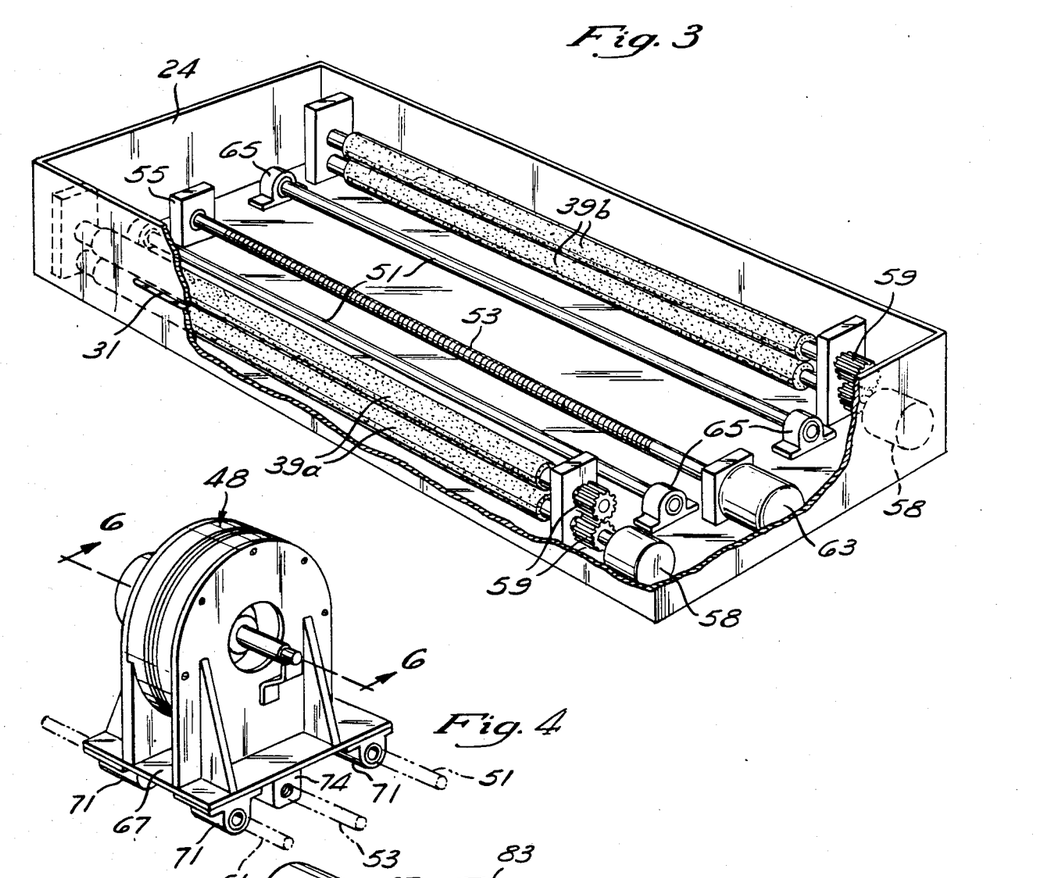
FIG. 3 is a partial perspective view, with portions broken away and portions in phantom, showing the film take-up and discharge rollers and the exposure carriage support and motive members as mounted on the base support in accordance with the present invention.
FIG. 4 is a partial perspective view, with portions in phantom, showing the exposure carriage as mounted on the support and motive members in accordance with the present invention.
Figure 10:
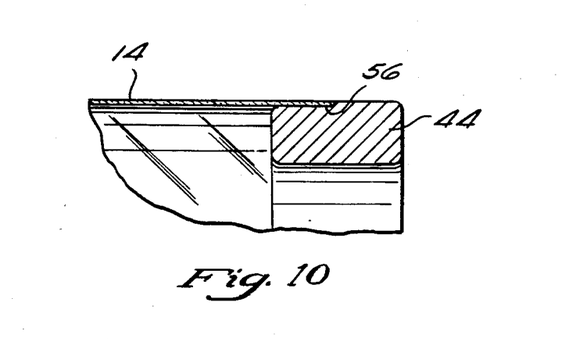
FIG. 10 is a partial side elevational view in section, taken substantially along the line 10—10 of FIG. 8, showing the lateral ring support carrying a portion of the photographic film.

As in shown in FIG. 2, the film exposure assembly 21, schematically depicted in FIG. 1, consists of a number of separate elements, including a first and a second outer stationary ring 43,44 respectively, separated by a central spinning disk assembly 48, the individual members of which will be discussed in further detail in connection with FIGS. 4 and 5. Both the outer stationary rings 43,44 and the spinning disk assembly 48 are mounted and ride upon a pair of support rods 51 (only one shown in FIG. 2). Lateral movement of the spinning disk assembly 48 is accomplished by rotation of a lead screw 53 to which the spinning disk assembly is attached. The lead screw 53 is rotated by a motor (not shown in FIG. 2), and extends from the motor to a terminal journal block 54 located opposite the motor within the printer support base 24. Since movement of the spinning disk assembly 48 is interlinked with rotation of the lead screw 53, control over the lateral positioning of the spinning disk assembly 48 is obtained through the motor for lead screw 53. Positioning of the pair of outer stationary rings 43,44 is done manually by the lateral displacement of the film guides 27 to which the stationary rings 43,44 are mechanically interlinked. A plurality of film guide retaining teeth 55 are provided to prevent the unintentional lateral movement of the film guides 27 and the interconnected stationary rings 43,44. As will subsequently be discussed in further detail, both the first and the second outer stationary rings 43,44 provide lateral support to the photographic film 14 while the film 14 is overlying the film exposure assembly 21. In FIG. 10, only the second outer stationary ring 44 is shown, the first outer stationary ring 43 being a mirror image thereof. A recessed surface 56 formed in the outer stationary rights 43, 44 receives a lateral edge of the photographic film 14. In the preferred embodiment, the recessed surface 56 is machined in the outer stationary ring with the amount of recess from the ring surface being preferably 0.025 inch (0.64 mm), with the width of the recessed surface being 0.25 inches (0.64 cm). It is thus important that the film guides 27 be laterally adjusted to correspond to the width of the photographic film 14, thus ensuring concomitant correspondence of the recessed surfaces 56 of the pair of outer stationary rings 43,44 with the width of the photographic film 14.

As discussed previously, the photographic film 14 is propelled through the photographic film printer 5 by the pairs of film take-up and discharge pinch rollers 39a,39b. The pinch rollers 39a,39b are of a conventional design, consisting of two elongate rods covered by an outer layer of resilient material 57, such as sponge rubber, with the preferred dimensions, of ⅛ inch (0.3 cm) foam material (such as that manufactured by Minnesota Mining & Manufacturing) and a ⅞ inch (2.2 cm) steel or aluminum rod. The photographic film 14 is received between the pinch rollers 39a,39b with the two rollers of each mounted sufficiently close to frictionally grip the photographic film 14 and propel it through the film printer 5. However, the resilient sponge surfaces 57 of the pinch rollers 39a,39b also grip the photographic film 14 in a manner permitting controlled amounts of tension to occur, thereby maintaining the film 14 under a state of tension while being transported through the photographic film printer 5.

Both sets of pinch rollers 39a,39b may, in the preferred embodiment, be provided with an independent source of rotational power. As shown in FIG. 3, a pair of pinch roller motors 58 are provided, with the rotational power generated by the pinch roller motors 58 transmitted to their respective pinch rollers 39a,39b by any conventional means. FIG. 3 illustrates the direct form of transmission utilizing a pair of pinch roller gears 59 shown in FIG. 3. Although not shown in FIG. 3, the rotational force between any two pinch rollers of the pinch roller pairs 39a,39b may also be transmitted through elastic cables and the like. In an alternate embodiment, only one pinch roller motor 58 is provided, (the alternate embodiment is not shown), with power being transmitted from the pinch roller motor 58 to the pinch rollers 39a,39b in a manner that will permit different rates of rotation between the two pairs of pinch rollers 39, thus also maintaining a slight level of tension on the photographic film 14 located within the film printer 5.

The lead screw 53 is rotatably mounted within the printer support base 24, with a stepper motor 63 providing the controlled rotation required to precisely position the spinning disk assembly 48. The support rods 51 likewise extend across the support base 24, with each of the support rods 51 supported by a pair of mountings 65 located at the lateral ends thereof. As shown in FIG. 4, the spinning disk assembly 48 is received and supported by a carriage 67. The support rods 51 in turn slideably receive and support the carriage 67 on a pair of linear bearings 71. A threaded bearing 74 on the carriage 67 receives the lead screw 53, in a manner whereby rotation of the lead screw 53 causes lateral motion of the carriage 67 along the extent of the rotating lead screw 53.

Figure 5:
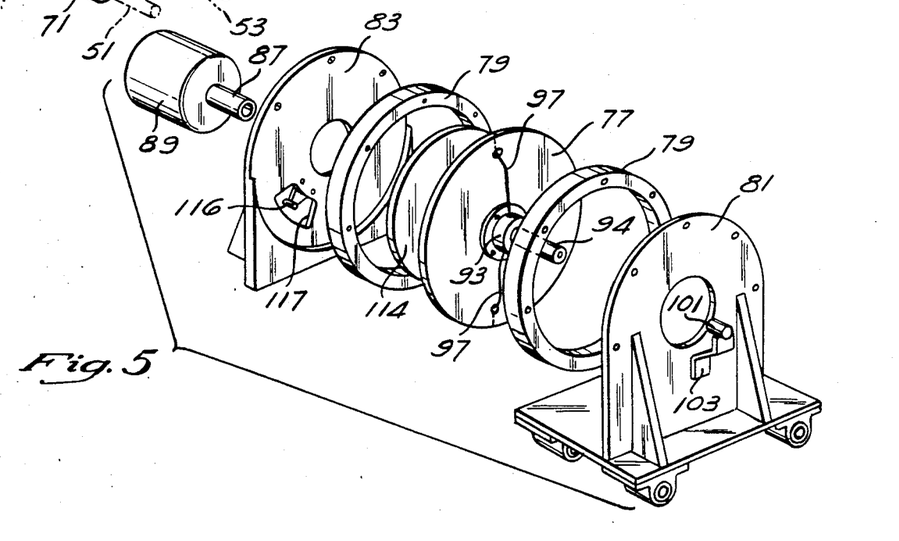
FIG. 5 is an exploded partial perspective view of the exposure carriage of FIG. 4.

The individual members of the spinning disk assembly 48 are most clearly shown in FIG. 5. The rotatable disk assembly 69 consists of a central exposure disk 77 lying between, but spaced apart from a pair of stationary film support shoes 79, in a manner permitting rotation of the exposure disk 77 between the adjacent stationary support shoes 79. A first and a second support frame 81,83, respectively, are attached to and provide support for the film support shoes 79, with the first and second support frames 81,83 likewise attached to the carriage 67. The method of attachment in either case may be of any conventional type, with machined screws being shown in the preferred embodiment with respect to the film support shoes 79 and the support frames 81,83.

The exposure disk 77 is mounted upon and carried by a shaft 87 of an electrical disk motor 89. A first and a second hub 93,94, respectively, project from the exposure disk 77 in a direction opposite that of the disk motor shaft 87, and, as discussed in greater detail in connection with FIG. 10, the double hub 93 receives a pair of glass optical fibers 97. When mounted, the projecting double hub 93 is optically coupled with an LED housing 101 attached to the first support frame 81 with a mounting bracket 103.

Figure 6:
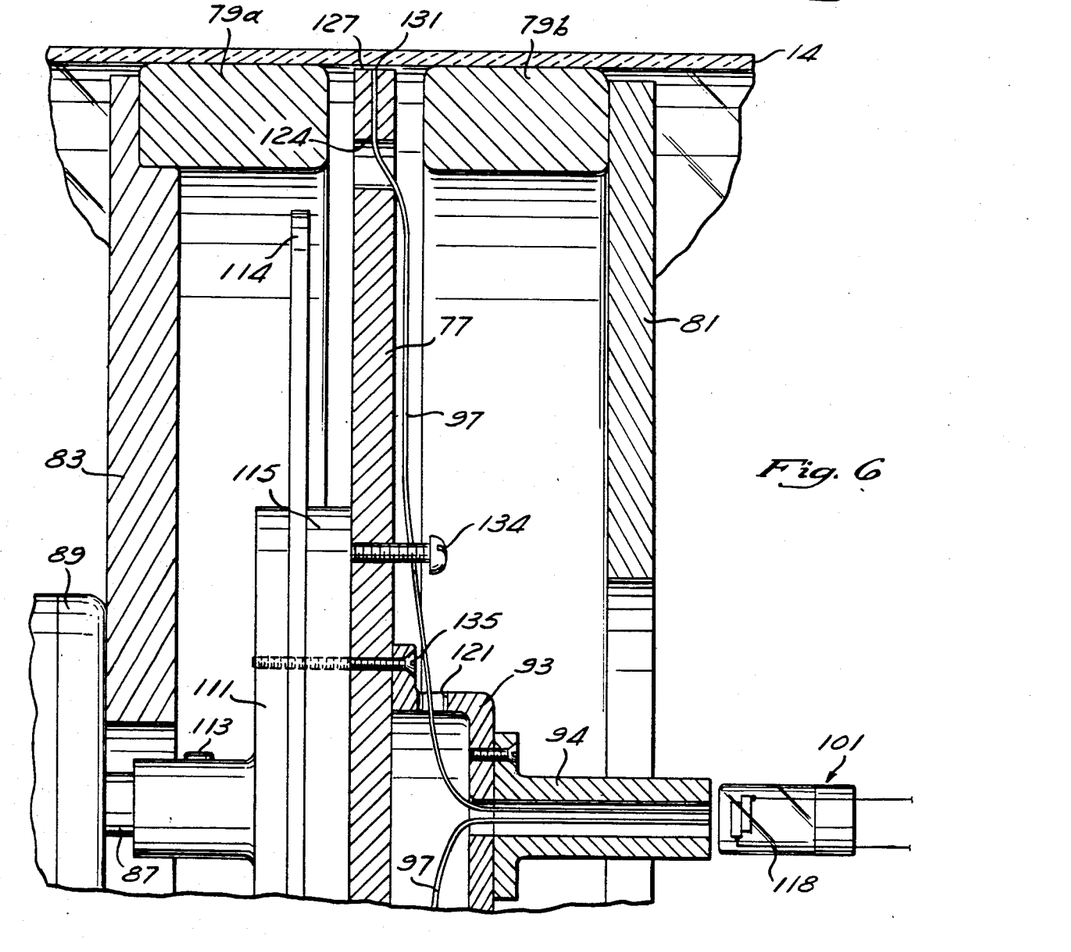
FIG. 6 is an enlarged partial side elevational view in section, taken substantially along the line 6—6 of FIG. 4, showing a rotational optical fiber disk and an adjacent pair of lateral support shoes in accordance with the present invention.

Additional operational details of the spinning disk assembly 48 can be obtained through reference to FIG. 6. Recalling that the first and the second support frames 81,83 support the first and second secondary film support shoes, 79a,79b, and maintain them in close proximity to the centrally located exposure disk 77, the exposure disk 77 is rotatably supported on the motor shaft 87 of the disk motor 89. The disk motor shaft 87 is received by a shaft-receiving hub 111 having a set screw 113, or the like, for retaining the hub 111 on the disk rotor shaft 87. The first and second central hubs 93,94 are likewise centrally mounted on the exposure disk 77 on the side opposite from the shaft receiving hub 111.

In a preferred embodiment a rotatable magnetic disk 114 is attached to the shaft-receiving hub 111, with a spacer disk 115 lying between the magnetic disk 114 and the exposure disk 77 to maintain a separation distance therebetween. As previously discussed, the magnetic disk 114 may be provided with a clocking track to enable a precise determination of the angular displacement of the exposure disk 77 with respect to the photographic film 14. The magnetic disk 114 is preferably of a diameter as to be capable of being located within the stationary support shoe 79. Information placed on the clocking track is obtained through a magnetic head 116 attached to the second support frame 83, with access provided by a window 117 formed in the support frame 83 (see FIG. 5).

The first and second central hubs 93,94 provide a housing for the optical fibers 97. The potted optical fiber receptors located within the second central hub 94, receive the electromagnetic radiation from an excited LED crystal 118 located in the LED housing 101. After emerging from the second central hub 94, the optical fibers 97 separate within the first central hub 93, prior to continuing to their respective locations on the periphery of the exposure disk 77. Any conventional fastening system, such as a machine screw 119, can be used to join the first and the second central hubs 93, 94.

After the pair of optical fibers 97 separate within the first central hub 93, a pair of first hub openings 121 (only one shown in FIG. 6) are formed in the first central hub 93, permitting the optical fibers 97 to pass therethrough. The glass fiber 97 preferably has a diameter of 1 mil (0.03 mm), and thus the diameter of the first hub openings 121 must be of sufficient size to permit the passage of the optical fibers 97 therethrough. Hub openings of 0.01 inch (0.3 mm) diameter are provided in the preferred embodiment. Each of the optical fibers 97 thereafter extend unrestrained, substantially along the surface of the exposure disk 77 towards a disk opening 124 formed in the exposure disk 77 adjacent a peripheral surface 127 of the exposure disk 77. A central peripheral throughbore 131 extends from the peripheral surface 127 to the disk opening 124, permitting the optical fiber 97 to enter the disk opening 124 and pass from that opening 124 to the optical fiber terminus at the peripheral surface 127. The optical fibers 97 thus extend from the potted receptor area of the second central hub 94, adjacent to the LED crystal 118, through the first central hub 93, along the surface of the exposure disk 77, to be thereafter anchored in the peripheral surface 127 in a manner that minimizes the amount of machining necessary. Where two optical fibers are provided, there will be two peripheral throughbores 131 located opposite one another on the exposure disk 77.

To ensure that both optical fibers transmit along the exact same scan track on the photographic film 14 when the exposure disk 77 is rotated, an adjustment screw 134 is provided in the exposure disk 77, opposite the shaft-receiving hub 111. Upon inward rotation thereof, the base of the adjustment screw 134 presses against the spacer disk 115, causing a warpage or bending to occur in a surrounding section of the exposure disk 77, ultimately creating a controllable warpage at the periphery thereof. By adjusting the amount of peripheral warpage utilizing the adjustment screw 134, the pair of optical fibers 97 can be made to provide identical scan tracks across the photographic film 14 upon rotation of the exposure disk 77. The shaft-receiving hub 111 and the associated rotatable disks are fastened together forming a rotating unit to enable the warpage to occur, using any conventional fastening means, such as a fastening screw 135, shown in FIG. 6.

To ensure reliable reproduction of images requiring high resolution values, it is essential that the spinning disk assembly 48 provide absolutely reliable support for the photographic film 14 adjacent to the rotating exposure disk 77 as it laterally moves across the base of the photographic film 14. The first and second stationary film support shoes 79a,79b are in slideable contact with the emulsion surface of the photographic film 14. The stationary film support shoes 79a,79b may conveniently be machined out of aluminum. However, the surfaces of the stationary film support shoes 79a,79b are chrome-plated and polished to minimize the disadvantageous effects of friction on the surface of the photographic film 14. In a preferred embodiment, the exposure disk 77 has a thickness, (which is equal to the width of the peripheral surface 127), of 0.125 inches (0.32 cm). The adjacent stationary film support shoes 79a,79b may be accordingly sized to have a width or thickness of 0.75 inches (1.9 cm) with a separation between the adjacent stationary support shoes 79a,79b of 0.25 inches (0.64 cm). Although to obtain the most accurate exposure requires the emitting end of the optical fibers 97 to be located as close as possible to the surface of the photographic film 14, care must be taken to assure that the moving peripheral surface 127 not make contact with the surface of the photographic film 14. The peripheral surface 127 is thus advantageously recessed 0.001 inches (0.03 mm) from the surface of the photographic film 14. In this manner, the likelihood of abrasive damage being done to the surface of the photographic film 14 by the peripheral surface 127 is greatly reduced. The photographic film itself is normally of a thickness of 0.004 inches to 0.007 inches (0.1-0.18 mm). Accurate exposure likewise demands a known time factor, and thus to ensure a constant and predictable exposure time, a high quality, reliable disk motor 89 is provided. Motors manufactured by Clifton Precision, such as Model B05-2317-3A-C are appropriate for this purpose.

To lessen the effect of distance variations between the photographic film 14 and the output tip of the optical fiber 97, a lens 136 (see FIG. 11) is mounted within the peripheral throughbore 131 at or near the peripheral surface 127. In such instance, the optical fiber 97 terminates within the throughbore 131 but is located one focal length from the lens 136, the same distance as the lens 136 lies from the photographic film 14. Use of the lens 136 is advantageous in two respects. Firstly, since the focal point can be located, within reason, at a specific, pre-selected location from the fiber output terminus, an accurate image is no longer dependent upon the difficult design task of minimizing the distance between the film surface and the fiber output terminus. Of perhaps even greater importance from a design standpoint is the provision by the lens 136 of an additional tolerance to variability in the fiber-to-film distance. Defined in magnitude as the depth of field for the lens, it consists of the linear distance on each side of the focal point at which the image divergence is within acceptable limits for a specific application. When no lens is provided, all of the light energy emerging from the optical fiber diverges at a certain angular rate, and for the exemplary optical fiber 97, this angle is approximately 20 degrees. The more distant the fiber is from its target, the less accurate or more diffuse the image becomes. However, if a lens is utilized, as in FIG. 11, after emergence from the fiber, the diverging image is once again made to converge at a fixed distance from the lens 136. Moreover, depending upon the configuration of the lens 136 and its placement in the peripheral throughbore 131, a depth of field of the focused image is created that permits a greater variance in film-to-fiber distance for a given image tolerance than is otherwise possible without a lens.

Figure 7:
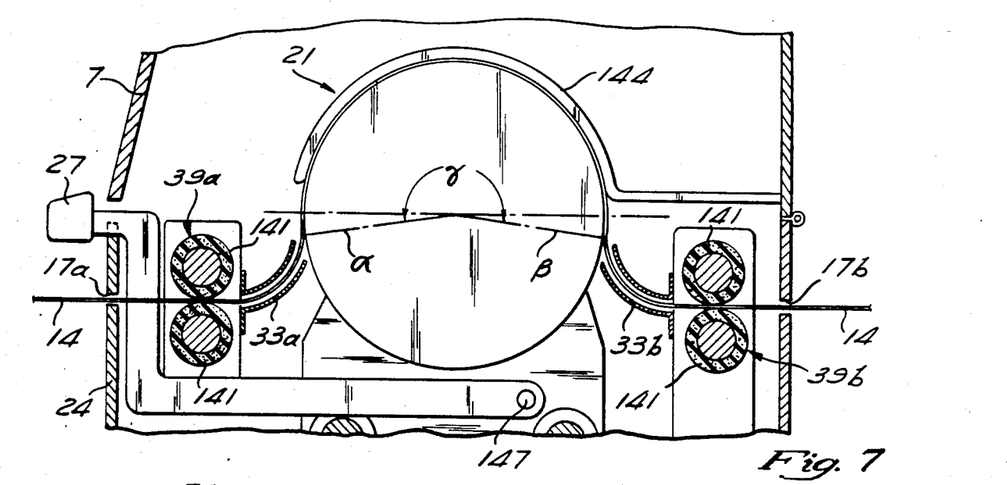
FIG. 7 is a partial side elevational view in section, taken substantially along the line 7—7 of FIG. 2, showing the film take-up and discharge rollers and the manner in which the film is placed in position for exposure in accordance with the present invention.

Irrespective of the fiber and/or lens location, it is equally important that the photographic film 14 be accurately and consistently placed into location for the exposure process utilizing the rotatable exposure disk 77. As illustrated in FIG. 7, the transport system for the photographic film 14 is exceedingly simple, yet is highly reliable for placing the film 14 in its proper location. Upon entering the printer support base 24 through an entry housing film slot 31a (the reference letters "a" and "b" will be used in FIG. 7 to distinguish between pairs of complementary structures), the photographic film 14 engages with and is affirmatively held between the pair of film entry pinch rollers 39a. To prevent damaging the surface of the photographic film 14, each of the film entry pinch rollers 39a is provided with the outer resilient layer 57. Thereafter, the film loading guide 33a, advantageously manufactured out of chrome-plated steel sheet metal, guides the film towards the various film support surfaces located on the film exposure assembly 21. A film guide cap 144 is placed over the film exposure assembly causing the photographic film 14 to conform to the semi-circular shape of the various film support surfaces of the film exposure assembly 21. In an alternate embodiment, the film guide cap is provided with an inside layer of felt (not shown) and a mechanism is also provided whereby the guide cap with the felt assumes a semi-retracted position from the film during its transport over the film exposure assembly prior to initiating a further exposure process. After completion of the film transport, the felt is again lightly pressed against the film, and remains so during exposure of the photographic film 14.

Returning to FIG. 7, after exposure, the photographic film 14 is transported from the film exposure assembly 21 through film removing guides 33b, under power provided by the pair of film exit pinch rollers 39b, which are similar in design to the film entry pinch loaders 39a. The film 14 is discharged from the housing 10 through an exit film slot 31b. Conventional film take-up and film dispensing units (not shown) may be used in conjunction with the photographic film printer 5, thereby enabling a continuous sheet of photographic film 14 to be used, further increasing the efficiencies provided by the film printer 5.

In addition to the importance of the film guide cap 144 in maintaining the photographic 14 film in a consistent, stable arrangement against the film exposure assembly 21, it is also important to ensure that the photographic film 14 lies against a circumference of the circular film exposure assembly 21 in an arc of greater than 180°. As shown in FIG. 7, an angle $\gamma$ is formed between a radius $\alpha$, formed at the circumferential location wherein the photographic film 14 is first tangent to the film exposure assembly 21 and a radius $\beta$ wherein the photographic film is last tangent to the film exposure assembly 21. To take advantage of a full 180° expanse of the photographic film 14 for imaging exposure, the angle $\gamma$ should always exceed 180°, and preferably lie within the range of 185°–190°. Variation in the angle $\gamma$ is achieved by adjustments made to the film entry and the film removal loading guides 33a,33b, changing the tangency locations.

Figure 8:
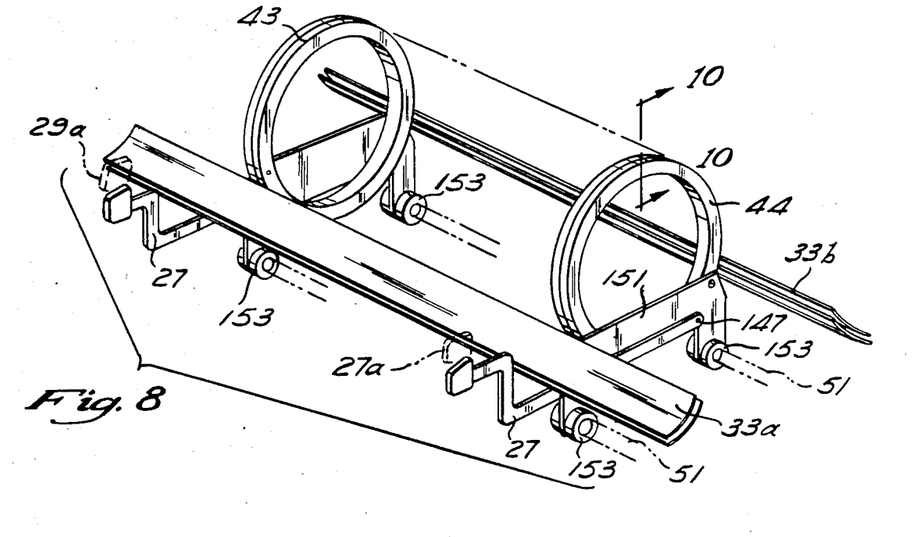
FIG. 8 is a partial perspective view, with portions in phantom, of the lateral film support members as shown in their operating position in accordance with the present invention.

The photographic film 14 is normally provided in 18-inch (46 cm) width. However, in the preferred embodiment the photographic film printer 5 has outer dimensions of 30 inches by 14 inches (76 cm by 36 cm) and can accept photographic film ranging in width from 6 inches–20 inches (15 cm–51 cm). When changing film widths, the film exposure assembly 21 also must be adjusted, to maintain adequate support for the photographic film 14 during the exposure thereof. Referring to FIG. 8, the first and the second outer stationary rings 43,44 are shown in position as part of the film exposure assembly 21. As discussed previously, the first and the second outer stationary rings 43,44 are mounted on and supported by the support rods 51 (shown in phantom) with the support rods 51 also permitting the lateral, sliding movement of the first and the second outer stationary rings 43,44 to accommodate photographic film 14 of different widths. The lateral movement of the first and the second outer stationary rings 43,44 is effected and controlled by manual pressure applied to the film guides 27. Prior to moving the first and the second outer stationary rings 43,44, the film guides 27 must first be disengaged from the film guide retaining teeth 55 (not shown in FIG. 8). As shown in phantom in FIG. 8, the film guides 27 are vertically raised to a position 27A, disengaging the film guides 27 from the film guide retaining teeth 55. Thereafter, lateral movement of the outer stationary rings 43,44 proceeds in a manner that will be described hereafter with reference to FIG. 9. The vertical movement of the film guides 27 is made possible by a pivot connection 147 between the film guide 27 and a stationary rings support bracket 151, which in turn supports the stationary rings 43,44. The stationary ring support brackets 151 are slideably mounted upon and received by the support rods 51 through a pair of linear support ring bearings 153.

Figure 9:
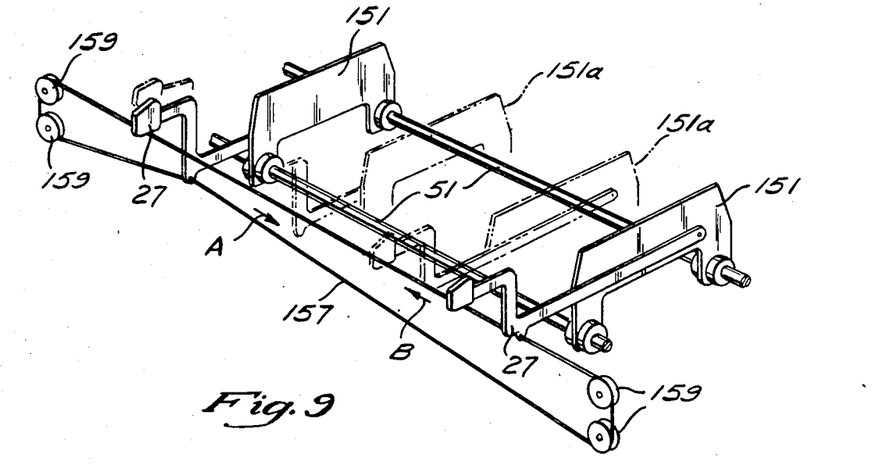
FIG. 9 is a partial perspective view of the stationary ring support brackets, showing the positioning thereof, with intermediate positions of the support brackets shown in phantom.

The lateral movement of the stationary rings 43,44 is best shown with reference to FIG. 9. For purposes of clarity, the actual ring assemblies have been removed, with only the stationary ring support brackets 151 shown as mounted on the support rods 51. To ensure that the lateral displacement of the first and the second stationary rings 43,44 remain symmetrical with respect to the spinning disk assembly 48, a film guide cable 157 is attached to each of the film guides 27. The film guide cable 157 is mounted on a series of cable pulleys 159 that are attached to the housing base 10 in a conventional manner, (not shown). Upon lateral movement of either film guide 27, the attached cable 157 will cause the corresponding film guide 27 to move an equal distance in a lateral direction opposite that from the first guide 27. An arrow A and an arrow B shown adjacent the film guide cable 157 in FIG. 9 illustrate this reciprocating motion.

In operation, the photographic film 14 enters the photographic film printer 5 through the outer housing film slot 17a, proceeds through the take-up pinch rollers 39a, and is loaded onto the film exposure assembly 21 by film loading guides 33a, to be held in place thereon by the film guide cap 144. Exposure of the photographic film 14 thereafter proceeds on a line-by-line basis, with the optical disk gradually progressing across the expanse of film. If two optical fibers 97 are used, each revolution of the exposure disk 77 provides two scans. At a disk rotation of 300 rpm, there are five revolutions per second, or ten scan tracks exposed per second. At this rotational speed, a full scan exposure of 18-inch wide film (46 cm) at 1 mil (0.025 mm) increments will require 1,800 seconds or ½ hour. This rotational rate of 300 rpm assumes a writing or exposure speed of 120,000 pixels/second or 0.1 second for 12,000 pixels, equaling one scan line for 12-inches of film length (30 cm). Increasing the writing or exposure rate to one million pixels/second, an approximately eight-fold increase, would reduce the full-scan exposure time from the previously calculated ½ hour to 3.8 minutes.

The amount of "information" required for exposure depends both upon the resolution desired and upon the nature of the "exposure." Taking as an example, a 12" by 18" exposure (30 cm by ˙ cm) at a resolution of 1,000 pixels/inch (394 pixels/cm) requires 216 million single-bit pixels for black and white or 27 megabytes of memory. The memory requirement increases as different exposure processes are used. Selection of the conventional 256-level gray scale (8 bits/pixel) increases the memory requirement to 216 megabytes of memory, and color reproduction, using three primary color LED's located in the LED housing 101 would require 648 megabytes for 256 levels of each red, green, and blue color pixels.

Figure 11:
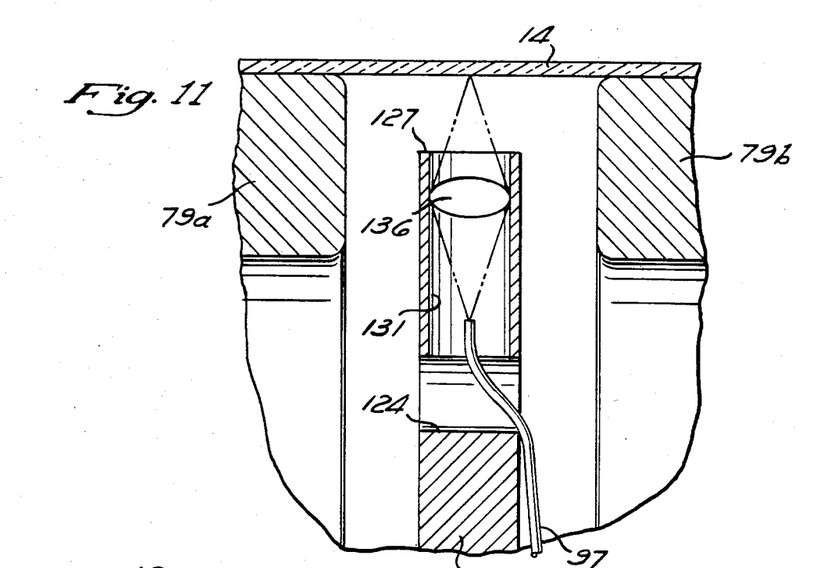
FIG. 11 is an enlarged, partial elevational view showing a portion of the optical fiber rotating disk when utilizing a focusing peripheral lens in accordance with an alternate embodiment of the present invention.
Figure 12:
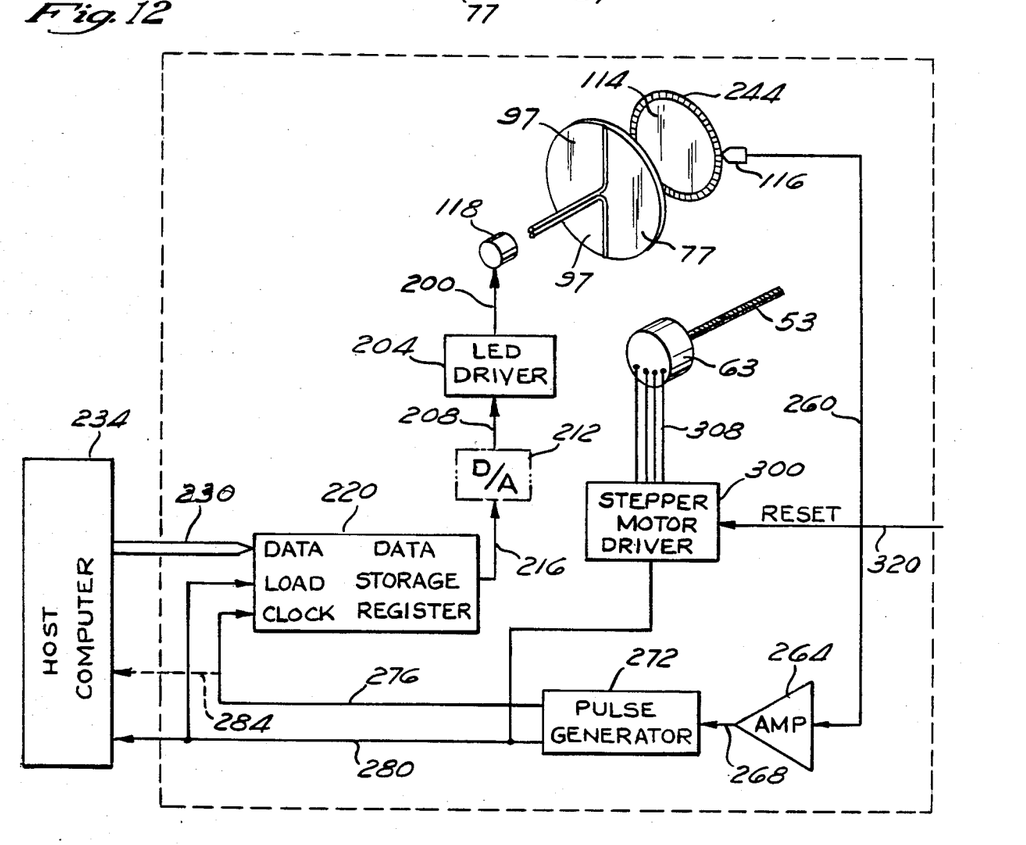
FIG. 12 illustrates an exemplary block diagram of an electronic circuit to drive the electrical components of the present invention.

FIG. 11 is a schematic block diagram for an exemplary electronic circuit to drive the electrical components of the present invention. The rotating exposure disk 77 is shown schematically along with the two optical fibers 97. The ends of the two optical fibers 97 are shown juxtaposed with the LED 118. The LED 118 is driven by a line 200 that is provided as an output from an LED driver 204. Although shown as a single line, one skilled in the art will understand that the line 200 represents a power line and a return line in exemplary embodiments of the device. The LED driver 204 can be a simple TTL driver gate in the case where black and white photographic reproduction is being processed, or, it can be an analog amplifier when used for 256-level gray scale photographic reproduction. The LED driver 204 is driven by a line 208, which is provided as an output from a digital-to-analog converter 212. The digital-to-analog converter 212 operates in a conventional manner and generates an analog output in response to a multi-bit digital input. For example, in the embodiment shown, the digital-to-analog converter 212 has as its input a line 216, which is connected to the output of a data storage register 220. The line 216 represents one or more digital data lines and, for 256-level gray scale, represents eight digital data lines. Thus, the digital-to-analog converter 212 will convert an eight-bit input on the line 216 from the data storage register 220 into a 256-level analog output on the line 208 to drive the LED 118 via the LED driver 204 and the line 200. The digital-to-analog converter 212 is shown in phantom for the reason that for black and white processing without multiple grey levels, the output of the data storage register 220 will be a single bit which drives the LED driver 204 directly.

The data storage register 220 is preferably a multiple-bit storage register having an input on a line 230 from a digital data source, such as a host computer 234. The line 230 preferably represents a data bus such as an eight-bit data bus. The data storage register 220 operates as a buffer and a synchronizer so that data can be loaded from the host computer 234 into the data storage register 230 at one data rate and can be provided as an output on the line 216 at a second data rate that is synchronized with the rotation of the exposure disk 77, as will be more clearly set forth below.

As illustrated in FIG. 11, the exemplary system includes a rotating magnetic disk 114 which has a clock track 244 magnetically encoded on it. The magnetic disk is preferably an aluminum disk with a magnetic coating such as those recording disks that are presently used in the hard disk drives used in the personal computer field. The rotating components of such a hard disk drive are readily adaptable for use in the present invention. Returning to FIGS. 5 and 6, the rotating disk 114 is shown mounted on the shaft receiving hub 111 proximate to the exposure disk 77. Thus, the magnetic disk 114 rotates in synchronism with the exposure disk 77. As discussed previously, the magnetic disk 114 preferably has an outside diameter less than the inside diameter of the first secondary film support shoe 79a so that the magnetic disk 114 rotates within and is protected by the first secondary film support shoe 79a. As shown in FIG. 5, the second support frame 83 has a window 117 formed therein. A magnetic read/write head 116 is mounted on the second support frame 83 and is positioned so that the read/write head 116 is suspended through the window 117. The read/write head 116 is positioned in the window 117 such that the head 116 just touches one surface of the magnetic disk 114 when the magnetic disk 114 is not rotating. As is well known in the magnetic disk recording art, when the magnetic disk 114 rotates, the movement of air along the surface of the rotating magnetic disk 114 causes the head 116 to "fly" away from the surface by a distance sufficient to prevent damaging contact with the surface, yet close enough so that the read/write head 116 can detect magnetic flux changes in the magnetically encoded clock track 244.

Returning to FIG. 11, the read/write head 116 is electrically connected via a line 260 to an amplifier 264. The small electrical signals induced in the read/write head 116 by the rotating clock track 244 are amplified by the amplifier 264 and are provided as an output signal on a line 268 to the input of a pulse generator 272.

The pulse generator 272 is responsive to the input signals on the line 268 to generate a first clock output on a line 276. The line 276 is provided as a synchronizing clock input to the data storage register 220. The data storage register 220 is responsive to the clock signal input on the line 276 to provide data output on the line 216 to the analog converter 212 (in the grey scale embodiment) or directly to the LED driver 204 (in the black and white embodiment). The clock track 244 on the magnetic disk 114 is encoded so that a clock signal is generated to correspond to each of the 12,000 data times that occur during each half-revolution of the exposure disk 77 to expose the photographic film (not shown) at the 1,000 pixel per inch resolution.

The clock track 244 is further encoded with a distinguishable code to indicate that one of the two optical fibers 97 is aligned with the leading edge of the photographic film. This code is generated once per each half-revolution of the exposure disk 77. For example, the distinguishable code advantageously can be two clock pulses that are more closely spaced than the 12,000 pixel clocks. The closely spaced clock pulses are detected by the pulse generator 272, which responds to the closely spaced clock pulses to generate an output signal on a line 280 to indicate that one of the two optical fibers 97 is at the leading edge of the photographic film. The line 280 is provided as a load input to the data storage register 220. The data storage register 220 responds to the load signal on the line 280 to begin outputting data on the line 216 that corresponds to the data to be placed at the leading edge of the film. At the same time, the load signal 280 is provided as an input to the host computer 234 to indicate to the host computer that a new scan line is being exposed on the photographic film. The load signal 280 is communicated to the host computer 234 to indicate that the electronics have responded to the previously sent data and notifies the host computer 234 that the data for the next command line should be sent. Preferably, the data storage register 220 comprises a buffer memory portion that enables the host computer 234 to transmit at least one scan line of digital data to the data storage register 220 at an asynchronous data rate while the data storage register 220 is outputting previously stored data on the line 216 at a synchronous data rate. In an alternative embodiment, the synchronous clock 276 can be provided as an input to the host computer 234 via a line 284 (shown in phantom) so that the host computer 234 provides digital data on the line 230 in synchronism with the rotation of the optical disk 77. In the alternative embodiment, the data storage register 220 can be a simple latch to receive the data from the line 230 and provide the data as an output on the line 216. In further alternatives, the magnetic disk 114 can have additional magnetic tracks recorded thereon and a plurality of read/write heads (not shown) can be provided so that the input data can be recorded onto and read from the additional tracks. Thus the magnetic disk 114 can provide an inexpensive means for buffering the input data.

In an embodimeng having an LED for each of the primary photographic colors, the data storage register 220, the digital-to-analog converter 212 and the LED driver 204 are reproduced for each of the three colors. Each of the three data storage registers 220 can be driven by the same pulse generator 272.

As also shown in FIG. 11, the load signal 280 from the pulse generator 272 is provided as an input to a stepper motor driver 300 via a line 304. The stepper motor driver 300 is advantageously a conventional design which provides phased stepping signals on a set of lines 308 to the stepper motor 63. As is well known in the art, by properly phasing the phased stepping signals on the lines 308, the stepper motor 63 can be caused to advance by a fixed rotational angle. The stepper motor driver 300 responds to the load signal on the line 304 and generates the phased stepping signals on the line 308 to advance the lead screw 53 by an amount such that the spinning disk assembly 48 is advanced by 0.001 inch. Thus, the spinning disk assembly 48 is advanced by 0.001 inch for each half-turn of the optical disk 77. A line 320 is provided as an input to the stepper motor driver 300 and is connected to a reset signal which may come from the host computer 234 or can come from a simple push button, or the like. The reset signal causes the stepper motor driver 300 to send a series of phased stepping signals on the lines 308 to reverse the direction of rotation of the stepper motor 63 to return the spinning disk assembly 48 back to the starting location.

While I have disclosed an exemplary structure to illustrate the principles of the present invention, it should be understood that I wish to embody within the scope of the patent warranted hereon, all such modifications as reasonably and properly come within the scope of my contribution to the art.

I claim:

1. A film printer for exposing photographic film based upon received digital information comprising:
   means for maintaining a surface of photographic film in a fixed, stationary position during the exposure thereof; and
   a spinning disk exposure assembly, comprising:
      an exposure disk, having an axis of rotation, and a central hub and a peripheral edge, both concentric with said axis of rotation;
      at least one optical fiber mounted on said exposure disk, said fiber having a first end located proximate to said central hub and having a second end located proximate to said peripheral edge;
      means for rotatably supporting said exposure disk within the spinning disk assembly;
      means for laterally translating said spinning disk exposure assembly across said surface of photographic film during the exposure thereof;
      a source of optical energy directed towards said first end of said optical fiber; and
      means for controlling the emission of said optical energy of said source in response to said received digital data and for coordinating said emission with the rotation of said exposure disk and with the lateral translating of said disk of exposure assembly.

2. A film printer as described in claim 1, wherein said means for laterally translating said spinning disk exposure assembly comprises:
   a stepper motor; and
   a lead screw having a first end attached to and rotated by said stepper motor and a second end attached to the exposure assembly by a threaded connection, whereby the controlled rotation of the lead screw by the stepper motor results in lateral movement of the exposure assembly.

3. A film printer as described in claim 1, wherein said source of optical energy comprises a light emitting diode.

4. A film printer as described in claim 1, wherein two optical fibers are mounted on said exposure disk, each of the fibers having a first end located proximate to said central hub and a second end located proximate to said peripheral edge of said exposure disk.

5. A film printer as described in claim 4, wherein said second ends of the two optical fibers are separated along said peripheral edge by an arc of approximately 180 degrees.

6. A film printer as described in claim 1, wherein said spinning disk exposure assembly further comprises:
   a focusing lens placed adjacent said second end of the optical fiber, whereby a focused image of the optical energy may be obtained and projected onto an adjacent surface of said photographic film.

7. A film printer as described in claim 1, wherein said means for rotatably supporting said exposure disk comprises:
   a pair of stationary film support shoes located adjacent one another and receiving said exposure disk therebetween;
   a rotary motor attached to one of said pair of stationary film support shoes, said motor having a projecting shaft that receives and supports the central hub of the exposure disk, said motor causing said exposure disk to spin about said axis of rotation; and
   a carriage for receiving and supporting said film support shoes, said carriage interconnected with and responsive to the means for lateral translation.

8. A film printer as described in claim 1, wherein said means for controlling the emission of the optical energy includes a magnetic disk mounted in the spinning disk exposure assembly and a magnetic head positioned proximate to said magnetic disk, said magnetic disk having a track of magnetically recorded information placed thereon in a manner that is readable by said magnetic head when said exposure disk is rotated.

9. A fiber optic photographic film printer for translating digital information to an optical image, comprising:
   a semi-circular, cylindrical stationery film support:
   an expanse of photographic film selectively received by said stationery film support, forming an inner, light sensitive surface;
   a rotatable disk received within the cylindrical film support, said rotatable disk having a peripheral arc substantially conforming to said inner, light-sensitive surface;
   an optical fiber attached to said rotatable disk in a manner permitting the transmittal of optical energy from a central location on said disk to a peripheral location on the disk adjacent to the inner, light-sensitive surface during the exposure thereof;
   means for moving said rotatable disk both rotationally about said peripheral arc and translationally along an axis parallel to the cylindrical film support during exposure of the inner, light-sensitive surface; and
   means responsive to said digital information for controlling the transmission of optical energy during the rotational and translational movement of the rotatable disk.

* * * * *